Jan. 15, 1963  E. J. DILLMAN  3,073,350
CONSTANT FLUID FLOW DEVICE
Filed Dec. 20, 1957  3 Sheets-Sheet 2
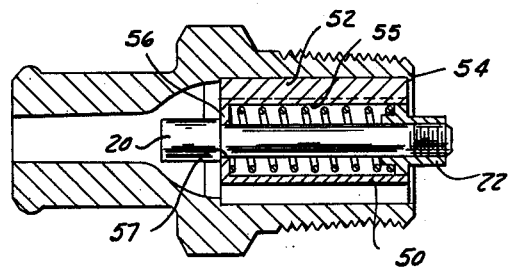
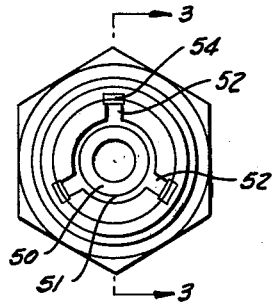
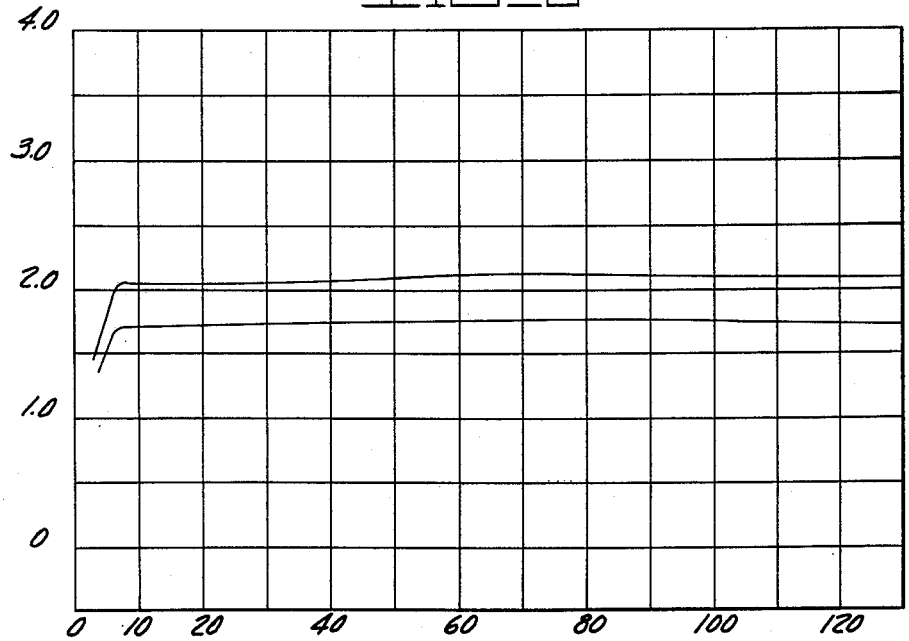
INVENTOR.
EARNEST J. DILLMAN
BY
Smith, Wilson, Lewis & McRae

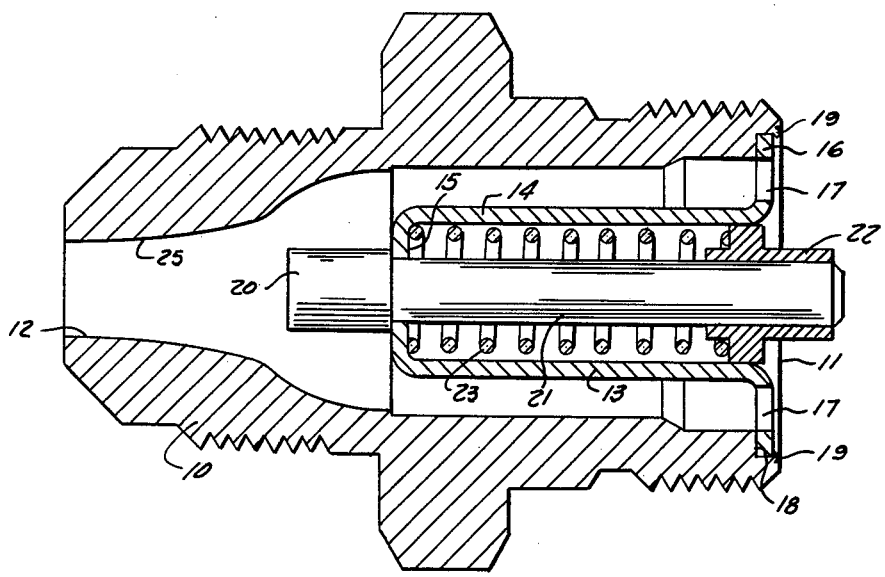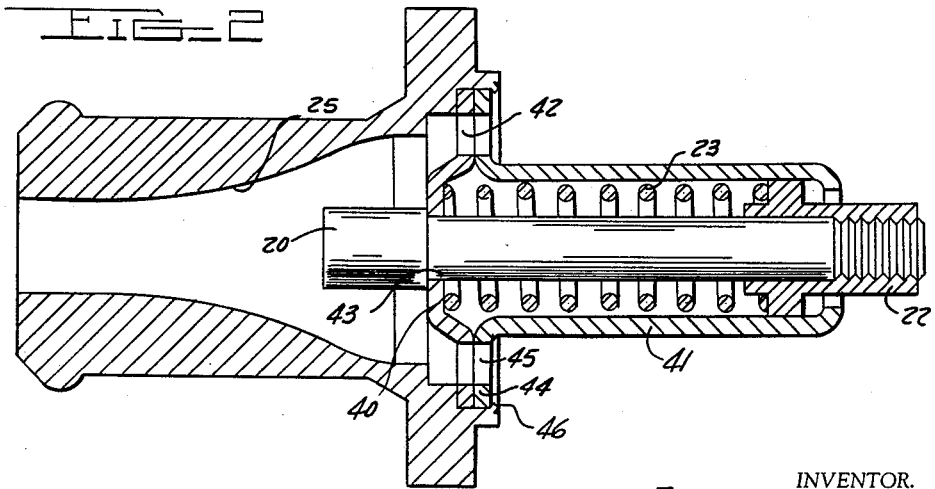

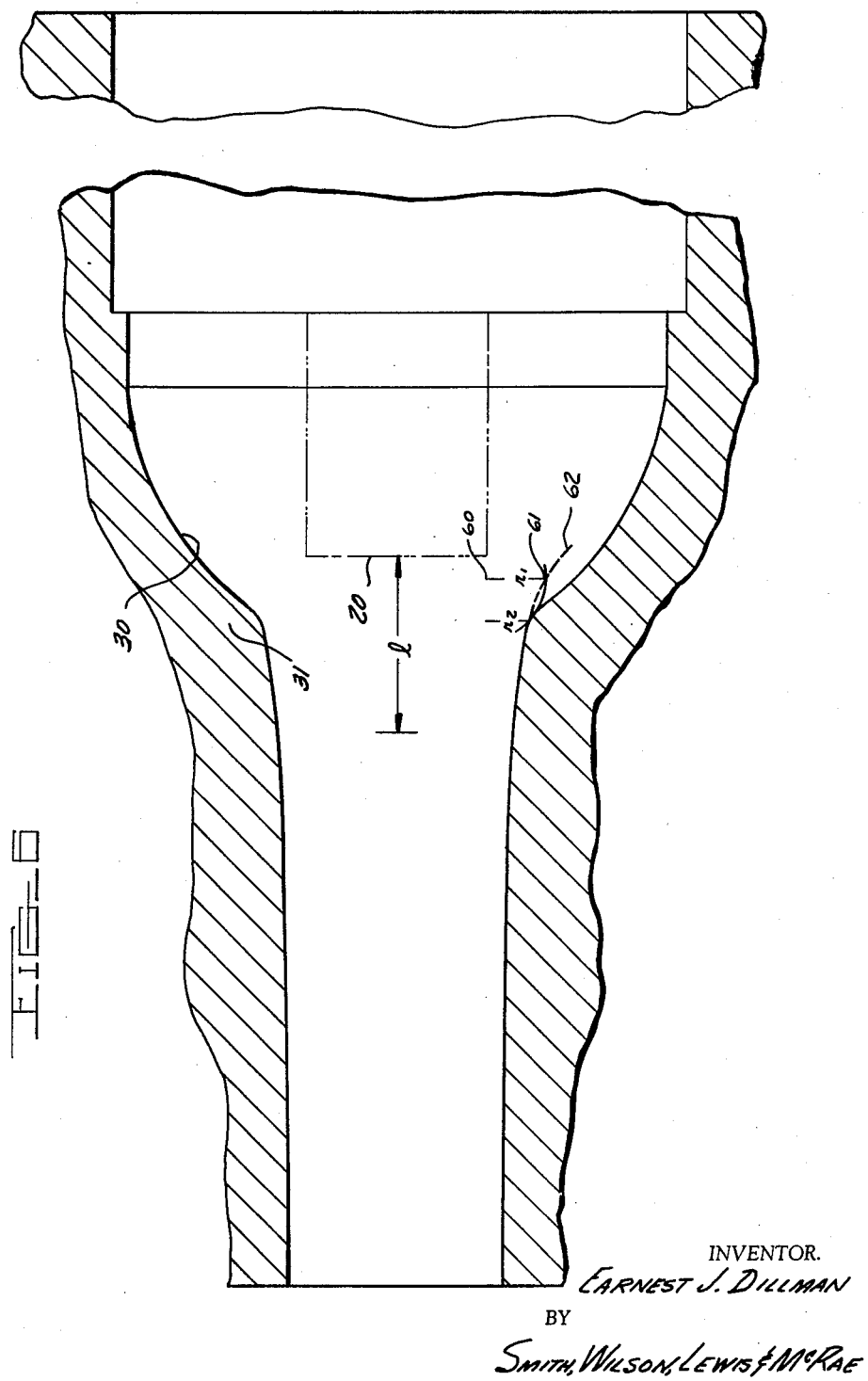

United States Patent Office 3,073,350
Patented Jan. 15, 1963

3,073,350
CONSTANT FLUID FLOW DEVICE
Earnest J. Dillman, Detroit, Mich., assignor to American Radiator & Standard Sanitary Corporation, New York, N.Y., a corporation of Delaware
Filed Dec. 20, 1957, Ser. No. 704,084
5 Claims. (Cl. 138—46)

This invention relates to a device for maintaining constant volumetric flow in a fluid line, irrespective of variations anywhere in the system. The device may be used in many different installations, as for example in the water lines leading to the tubs of automatic clothes washing machines, dishwashing machines and other plumbing fixtures, as well as in refrigeration systems to give constant flow of liquid refrigerant to the evaporator or vapor refrigerant to the compressor.

Objects of the invention are to provide a volumetric flow control device wherein:

(1) The device is enabled to control the volumetric flow under conditions when the pressure drop across the device is relatively low, as for example eight or ten p.s.i., (2) The device is capable of manufacture as a relatively low cost item, (3) The device is designed to have relatively short axial length so as to permit it to be installed in small spaces, and (4) The device is constructed to have a relatively small diametrical dimension so as to conserve on the quantity of material employed.

Other objects of this invention will appear in the following description and appended claims, reference being had to the accompanying drawings forming a part of this specification wherein like reference characters designate corresponding parts in the several views.

In the drawings:

FIG. 1 is a sectional view through one embodiment of the invention.

FIG. 2 is a sectional view through a second embodiment of the invention.

FIG. 3 is a sectional view through another embodiment of the invention.

FIG. 4 is an end view of the FIG. 3 embodiment.

FIG. 5 is a graph showing the performance of the illustrated embodiments.

FIG. 6 is an enlarged cross sectional view showing a flow passage configuration utilized in the FIGS. 1, 2 and 3 embodiments.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIG. 1, there is shown a flow tube 10 having an inlet end 11 and an outlet end 12. Positioned within tube 10 is a one piece guide structure 13, conveniently formed as a low cost stamping. Structure 13 includes tubular section 14 having an inwardly radiating abutment flange 15 at its downstream end, and an outwardly radiating flange 16 at its upstream end. A series of openings 17 are provided in flange 16 for permitting the desired fluid flow into tube 10.

Flange 16 seats in an annular recess 18, and tube wall sections 19 are staked onto the upstream face of the flange to fixedly position guide structure 13 in the tube.

Volumetric flow through the tube is controlled by a cylindrical plunger 20, which is fixedly carried on the downstream end of a shaft 21. The upstream end of shaft 21 fixedly carries an enlargement in the form of a collar 22, which is slidably engaged with the surface of tubular section 14. A constant rate compression spring 23 is positioned between collar 22 and flange 15 so as to draw plunger 20 in an upstream direction to its illustrated position. The term "constant rate" is used to indicate that the spring develops a constant increment of increasing force as plunger 20 moves each successive increment of distance downstream from flange 15. In one actual construction spring 23 has a spring rate of ten pounds per inch movement, so that when plunger 20 has moved downstream a distance of .300 inch the spring will have developed a force of three pounds. Similarly when the plunger has moved .450 inch the spring will have developed a force of four and one-half pounds.

As plunger 20 moves downstream it reduces the flow area between it and the passage surface 25 so as to maintain constant volumetric flow with increasing pressure drops. Surface 25 is given a predetermined configuration in order to achieve the desired results.

The theoretical flow of water through the flow passage is in accordance with the following formula; other fluids would require a different constant in place of constant 38:

$$A = \frac{Q}{38\sqrt{P}} \quad (1)$$

where

A is the cross sectional area of the flow passage,
Q is the volumetric flow through the passage in gallons per minute, and
P is the p.s.i. pressure drop across the device.

However, in practice the flow passage does not allow the theoretical flow, and it is therefore necessary to employ a coefficient of discharge in conjunction with the above formula. Actual experiments indicate a coefficient of discharge of .82 for the illustrated flow device. In utilizing the coefficient, if for example it is desired to design a flow device to deliver 2.5 g.p.m. then it is necessary to base the calculations on 2.5/.82 g.p.m. or 3.05 g.p.m.

Formula 1 is set forth in terms of p.s.i. pressure drop across the device. However, this pressure drop is balanced by the force of spring 23, and it is accordingly possible to translate the pressure drop into terms of the spring force. The spring develops a different force for each position of plunger 20, and it is thus possible to also translate the spring force into terms of the plunger position. In this way it is possible to utilize Formula 1 to determine the necessary flow passage area at different axial distances from plunger 20.

One actual device employs a spring rate of ten pounds per inch movement of plunger 20, a plunger cross section of 0.2 square inch, and a volumetric flow of 2.0 gallons per minute. In determining what the cross sectional area of the flow passage should be at a distance of .25 inch downstream from the plunger, the spring force is first calculated to be 10×.25 or 2.5 pounds. This can be translated into 2.5/.02 in.² piston area or 125 p.s.i. This 125 p.s.i. is equivalent to the pressure drop across the device; accordingly the figure may be employed as P in Formula 1 to determine the desired cross sectional area of the flow passage at a point .25 inch downstream from the plunger. In similar manner the cross sectional area may be calculated at other distances from the plunger so as to develop the entire passage configuration.

In the above described construction the passage diameter at various distances $l$ from the end of the plunger are calculated to be

| $l$ inches: | Passage diameter |
|---|---|
| .020 | .2266 |
| .030 | .2159 |
| .050 | .2045 |
| .200 | .1834 |

In making the calculations it will be understood that flow passage is an annular passage defined by the downstream edge of plunger 20. Accordingly, in calculating the passage diameter the plunger area (.02 in.²) must be added to the A in Formula 1. In the actual calculations Formula 1 is rearranged to give a formula:

$$A_1 = \frac{Q}{c \times 38\sqrt{P}} \quad (2)$$

where
A is the cross sectional area of the annular flow path at different distances $l$ from the downstream end of the plunger (in the rest position),
Q is the desired quantity rate of flow,
c is the coefficient of discharge for the passage, and
P is the spring rate multiplied by the distance $l$ and divided by the plunger area.

FIGURE 5 plots the performance of the above described 2 gallon per minute construction. FIGURE 5 also plots the performance of a 1.6 gallon per minute construction designed in accordance with the above formulas.

It will be noted from the graph that the devices begin to deliver the desired volumetric flows at approximately seven or eight p.s.i. drop. Further, the devices deliver eighty per cent of their rated flows at about five p.s.i. drop; commercially the devices are acceptable in many cases when they deliver eighty per cent of the rated flow. Most prior art devices do not begin to deliver the desired flow until after pressure drops of fifteen p.s.i. or more. This is particularly disadvantageous because it requires higher source pressures for delivering fluid through the device and other flow mechanisms in the system.

It will be noted from FIG. 6 that the passage configuration at 30 (upstream from point 31) is considerably "bulged out" or enlarged as compared with the passage configuration downstream from point 31. Actually, the surface configuration at 30 is designed to give greater annular areas than that calculated in accordance with Formulas 1 and 2; the passage-forming surfaces follow the "formula" values only for those surfaces downstream from point 31.

If the formulas were employed for surfaces 30 these surfaces would follow the imaginary line 62; as a result the flow path would be reduced below the calculated value after it had passed the end of plunger 20. Thus, for a given movement of plunger 20 to a point 60 the radially aligned passage wall surface is calculated to be located at a point 61. In order that the flow path at plunger position 60 be no smaller than the annular area defined between points 60 and 61 it is necessary that the imaginary arc $r_1$ be drawn so as not to strike through the passage wall; however this is impossible when point 61 is chosen as a passage surface. It is seen therefore that point 61 cannot be chosen as a passage-forming surface.

The process of striking imaginary arcs through different points on the calculated passage-forming surface can be continued for different plunger positions. At point 31 it is found that imaginary arc $r_2$ does not strike through downstream portions of the passage wall. Thus at point 31 it is permissible to begin utilizing the calculated passage diameters. At points upstream from point 31 the passage must be "bulged out" from the calculated configuration in order to provide the desired flow path.

The FIG. 2 device is similar to the FIG. 1 device in the design of the flow passage configuration. However the FIG. 2 device employs a different manner of mounting the plunger. Thus, the FIG. 2 construction employs a two piece guide structure formed by a plunger-abutment plate 40 and tubular guide element 41. Plate 40 is provided with flow apertures 42 and a central guide opening 43. Guide element 41 is provided with an outwardly radiating flange 44 having flow apertures 45. Wall portions 46 of the flow tube are staked onto the face of flange 44 to hold the guide structure in fixed position.

The FIG. 2 device is particularly designed for use in place of the outlet spigot structures commonly employed on water mixing valves utilized in automatic clothes washing machines. Conventionally, a resilient rubber annulus is employed in the spigot to control the volumetric flow. However the annulus is not operative at low pressure drops, and additionally the rubber annulus requires a spigot of comparatively large diametrical dimension. This is due to the fact that the flow is through the center of the annulus instead of around the periphery; as a result a comparatively large diameter annulus is required for any given flow, with a correspondingly large spigot structure.

The FIG. 3 device is similar to the FIG. 1 device except that stamping 13 is replaced with a one piece extruded guide member 50. Guide member 50 includes a tubular section 51 and three struts 52. Wall portions 54 of the flow tube are staked onto the struts to secure member 50 in fixed position. Tubular section 51 forms a cylindrical surface 55 and an abutment wall 56, which is provided with a central guide opening 57.

Member 50 is initially extruded as a solid piece without opening 57 or surface 55. Opening 57 and surface 55 are subsequently formed by drilling out the block. Member 50 can also be formed by "powdered metal" molding operations.

Each of the illustrated embodiments employs relatively low cost parts so as to provide competitive structures. Additionally the axial length of each device is inherently short as compared with similar "plunger-spring" type constructions. Thus, in all forms of the invention, the plunger does not increase the length of the device when it is in a downstream location; in some prior art units the plunger (instead of the passage) is given a tapering configuration, and as a result the plunger moves through a fixed orifice so as to increase the total length of the device during operation at high pressure drops.

The illustrated plunger-passage arrangement is further advantageous because the spring is enabled to have the same increased effect on the plunger with each increment of piston movement; this feature is due to the fact that the plunger presents the same cross sectional area to the flow irrespective of its position. If the plunger were tapered so as to move through an orifice of fixed diameter the spring effect would be varied because the plunger would present different cross sectional areas to the flow at different plunger positions.

I claim:
1. In a constant fluid flow device, comprising
a body defining a flow passage having an inlet and an outlet,
said flow passage progressively decreasing in cross sectional area from said inlet to said outlet, a cylindrical plunger of a diameter less than the minimum diameter of said passage and positioned in axial alignment within said passage for axial movement in said passage, means supporting said plunger on the upstream side for said axial movement into said passage, means normally biasing said plunger to a rest position at the inlet of said passage, and said passage decreasing in cross sectional area in accordance with the formula $$A_1 = \frac{Q}{c\sqrt{P}}$$

wherein A is the cross sectional area of the annular flow path between the downstream end of said plunger at rest position and said passage at different distances $l$ from the downstream end of said plunger, Q is the desired quantity rate of flow, c is the coefficient of discharge for the passage, and P is the spring rate multiplied by the distance $l$ and divided by the plunger area.

2. In a constant fluid flow device, comprising a body defining a flow passage having an inlet and an outlet, said passage tapering in progressively decreasing cross sectional area from said inlet to said outlet, a cylindrical plunger having a diameter less than the minimum diameter of said passage, said plunger having an axially extending support shaft, a tubular guide positioned coaxially of said passage, support means extending between said guide and said body to support said guide, a transverse wall formed on the downstream end of said guide and having an opening coaxial to said guide, said plunger support shaft being slidably extensible through said wall opening with said plunger positioned on the downstream side of said wall for axial movement into said passage from a rest position adjacent the inlet, said plunger shaft having an annular collar connected thereto and slidable within said guide to provide axial movement of said plunger and shaft, and a coil compression spring positioned in surrounding relation to said shaft between said transverse wall and said collar to normally bias said plunger toward said rest position.

3. In a constant fluid flow device, comprising a body defining a flow passage having an inlet and an outlet, said passage tapering in progressively decreasing cross sectional area from said inlet to said outlet, a straight cylindrical plunger positioned within said passage for axial movement from a rest position adjacent the inlet, means supporting said plunger on the upstream side for said axial movement into said passage to retain said passage free of obstruction, and means normally biasing said plunger toward said rest position.

4. In a constant fluid flow device comprising a body defining a flow passage having an inlet and an outlet, said passage tapering in progressively decreasing cross sectional area from said inlet to said outlet, a cylindrical plunger having a diameter less than the minimum diameter of said passage, said plunger having a support shaft extending axially from one end, a tubular guide positioned coaxially within said passage, means extending between said guide and said body to support said guide, a transverse wall extended across the downstream end of said guide and having an opening coaxial to said guide, said plunger support shaft being slidably extended through said wall opening with said plunger positioned on the downstream side of said transverse wall for axial movement into said passage from a rest position at the inlet, a collar connected to said plunger support shaft in spaced relation from said plunger and slidable within said guide to provide axial movement of said plunger and shaft, a coil compression spring positioned in surrounding relation to said shaft between said transverse wall and said collar to normally bias said plunger toward said rest position, and said passage decreasing in cross sectional area in accordance with the formula $$A_1 = \frac{Q}{c\sqrt{P}}$$

wherein A is the cross sectional area of the annular flow path between the downstream end of said plunger at rest position and said passage at different distances $l$ from the downstream end of said plunger, Q is the desired quantitative rate of flow, c is the coefficient if discharge for the passage, and P is the spring rate multiplied by the distance $l$ and divided by the plunger area.

5. In a constant fluid flow device, comprising a body defining a flow passage having an inlet and an outlet, said passage tapering in progressively decreasing cross sectional area from said inlet to said outlet, a cylindrical plunger having an axially extending support shaft, a tubular guide positioned in axially aligned relation to said passage upstream of said inlet, a transverse wall extended across the downstream end of said guide and having an opening coaxial to said guide, support means extending between said transverse wall and said body to support said guide, said plunger support shaft being slidably extended through said wall opening with said plunger positioned on the passage side of said wall, a collar on said support shaft spaced from said plunger and slidable within said guide to provide axial movement of said plunger, a coil spring positioned in surrounding relation to said shaft between said transverse wall and said collar to bias said plunger into engagement with said transverse wall, and said passage tapering in progressively decreasing cross sectional area toward said seat in accordance with the formula $$A_1 = \frac{Q}{c\sqrt{P}}$$

wherein A is the cross sectional area of the annular flow path between the downstream end of said plunger at rest position and said passage at different distances $l$ from the downstream end of said plunger, A is the desired quantity rate of flow, c is the coefficient of discharge for the passage, and P is the spring rate multiplied by the distance $l$ and divided by the plunger area.

References Cited in the file of this patent

UNITED STATES PATENTS

| | | |
|---|---|---|
| 780,986 | Francis | Jan. 31, 1905 |
| 1,063,933 | Keller | June 3, 1913 |
| 2,173,022 | Mitchell | Sept. 12, 1939 |
| 2,853,098 | Fritzsche | Sept. 23, 1958 |
| 2,929,402 | Streeter | Mar. 22, 1960 |

FOREIGN PATENTS

| | | |
|---|---|---|
| 109,199 | Great Britain | Sept. 6, 1917 |